United States Patent
Gustine et al.

(10) Patent No.: US 6,563,050 B2
(45) Date of Patent: May 13, 2003

(54) CABLE HEAD ASSEMBLY

(75) Inventors: Gary Gustine, Bonham, TX (US);
Charles G. Ham, Mound, MN (US);
Matthew Kusz, Minneapolis, MN (US);
Fredrick Daniels, Floral City, FL (US);
Michael Sawyer, Riverview, FL (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/804,106

(22) Filed: Mar. 12, 2001

(65) Prior Publication Data
US 2002/0125032 A1 Sep. 12, 2002

Related U.S. Application Data

(60) Provisional application No. 60/246,141, filed on Nov. 6, 2000.

(51) Int. Cl.[7] .................. H02G 15/013; H02G 15/04
(52) U.S. Cl. ................... 174/65 R; 174/74 A; 174/135; 174/151; 174/50
(58) Field of Search ................. 174/65 R, 58, 174/50, 52.3, 60, 68.1, 64, 18, 66, 67, 251, 74 A, 23 R, 50.5, 135, 151; 220/3.2, 3.3; 439/457, 458, 936, 466, 468

(56) References Cited

U.S. PATENT DOCUMENTS

| | | | | |
|---|---|---|---|---|
| 3,809,798 A | * | 5/1974 | Simon | 174/135 |
| 3,997,819 A | | 12/1976 | Eggert et al. | |
| 4,528,615 A | * | 7/1985 | Perry | 174/70 S |
| 4,679,250 A | | 7/1987 | Davis et al. | |
| 4,775,122 A | * | 10/1988 | McClymont | 174/65 R |
| 4,801,118 A | * | 1/1989 | Wium | 24/546 |
| 4,962,445 A | * | 10/1990 | Pelet et al. | 174/16.3 |
| 5,151,050 A | * | 9/1992 | Scholz et al. | 439/456 |
| 5,162,612 A | * | 11/1992 | Naka et al. | 174/48 |
| 5,309,315 A | | 5/1994 | Naedel et al. | |
| 5,563,378 A | * | 10/1996 | Uchida et al. | 174/135 |
| 5,792,988 A | * | 8/1998 | McIntire et al. | 174/74 R |
| 6,045,140 A | * | 4/2000 | Morris, Jr. | 277/630 |
| 6,118,662 A | | 9/2000 | Hutchinson et al. | |
| 6,207,893 B1 | * | 3/2001 | Guiol | 174/65 R |
| 6,259,033 B1 | * | 7/2001 | Kassulat | 174/151 |

FOREIGN PATENT DOCUMENTS

| | | |
|---|---|---|
| EP | 0 486 935 A | 5/1992 |
| FR | 1 379 736 A | 11/1964 |
| FR | 2 623 344 A | 5/1989 |

OTHER PUBLICATIONS

Abacon Telecommunications, HDSL Low Capacity Repeater Case, 1 pg., date unknown.
Abacon Telecommunications, HDSL High Capacity Repeater Case, 2 pgs., date unknown.
Circa Enterprises, Inc. "Digital Repeater Housings—HDSL Repeater", 2 pgs., 2000.
Circa Enterprises, Inc. "Digital Repeater Housings—T1 Repeater", 2 pgs., 2000.

* cited by examiner

*Primary Examiner*—Dean A. Reichard
*Assistant Examiner*—Angel R. Estrada
(74) *Attorney, Agent, or Firm*—Fogg and Associates, LLC; Laura A. Ryan

(57) ABSTRACT

A cable assembly is provided. The cable assembly includes an interface plate having a raised outer surface and an inner surface. The inner surface is adapted to engage with a housing. The interface plate includes a recess having a channel that is adapted to receive a cable and an opening through the interface plate at one end of the channel to allow the cable to pass through the interface plate. The recess is adapted to receive a sealant that covers the cable once the cable is placed in the channel.

17 Claims, 6 Drawing Sheets

CABLE HEAD ASSEMBLY

CROSS REFERENCE TO RELATED APPLICATIONS

This application claims benefit under 35 U.S.C. §119(e) of U.S. Provisional Application Serial No. 60/246,141, filed Nov. 6, 2000, which is incorporated herein by reference.

U.S. application Ser. No. 29/132,247, entitled RADIATING REPEATER CASE, and filed on Nov. 6, 2000.

Each of these applications is incorporated herein by reference.

TECHNICAL FIELD

The present invention relates generally to the field of telecommunications and, in particular, to a cable assembly for repeater cases.

BACKGROUND

With the growth of T1 lines, expanded DSL applications and the introduction of HDSL2 repeaters to the industry a significant quantity of housings are required to accommodate the equipment to support these applications. Due to the stringent requirements for both above and below ground housing applications there are a quantity of shortcomings associated with the current repeater housings and cable assemblies. The repeater housing assemblies are both costly and time consuming to manufacture. Currently cables that connect to the repeaters are potted into repeater housings. The potting is not only costly but can require up to 24 hours to cure. In some applications the curing is required in specified environmental conditions, e.g., temperature control, humidity control and the like. Once the cables are potted into the housings they become integral to the housings. Any problems encountered in coupling the potted cables with the telecommunications lines, e.g., cutting the cable too short, results in having to dispose of the integrated housing/cable assembly.

In order to produce the housing assemblies in quantity, a significant amount of environmentally controlled space is required as well as storage space for complete housing assemblies. Due to the storage requirements assemblies are often performed on demand and customers are required to wait while orders before theirs are filled.

The cable assembly has minimum flexibility once the cable is potted in the housing. In addition, since the cable is integral to the housing assembly the cable experiences a significant amount of strain at the connection point during installation and after installation. Because the housing and cables are pre-assembled for the application the housings are only capable of receiving the cables in one orientation. As a result, the location and orientation of housings is limited. In many of the repeater housings the cable is attached using a twist lock connector. In some applications, the twist lock connectors become loose and leak due to strain on the cable during assembly and over time after assembly. Because of the limited orientation of the housings, strain on the cables can cause the twist lock to become loose and historically has allowed ingress of moisture.

For the reasons stated above, and for other reasons stated below which will become apparent to those skilled in the art upon reading and understanding the present specification, there is a need in the art for improvements in repeater housings.

SUMMARY

The above mentioned problems with cable assemblies for repeater housings and other problems are addressed by embodiments of the present invention and will be understood by reading and studying the following specification.

In one embodiment, a cable assembly is provided. The cable assembly includes an interface plate having a raised outer surface and an inner surface. The inner surface is adapted to engage with a housing. The interface plate includes a recess having a channel that is adapted to receive a cable and an opening through the interface plate at one end of the channel to allow the cable to pass through the interface plate. The recess is adapted to receive a sealant that covers the cable once the cable is placed in the channel.

In another embodiment, a repeater housing is provided. The repeater housing includes an outer shell, a card cage adapted to thermally couple to the outer shell and an interface plate adapted to couple with the card cage. The interface plate having a raised outer surface and an inner surface. The interface plate includes a recess having a channel that is adapted to receive a cable and an opening through the interface plate at one end of the channel to allow the cable to pass through the interface plate. The recess is adapted to receive a sealant that covers the cable once the cable is placed in the channel.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
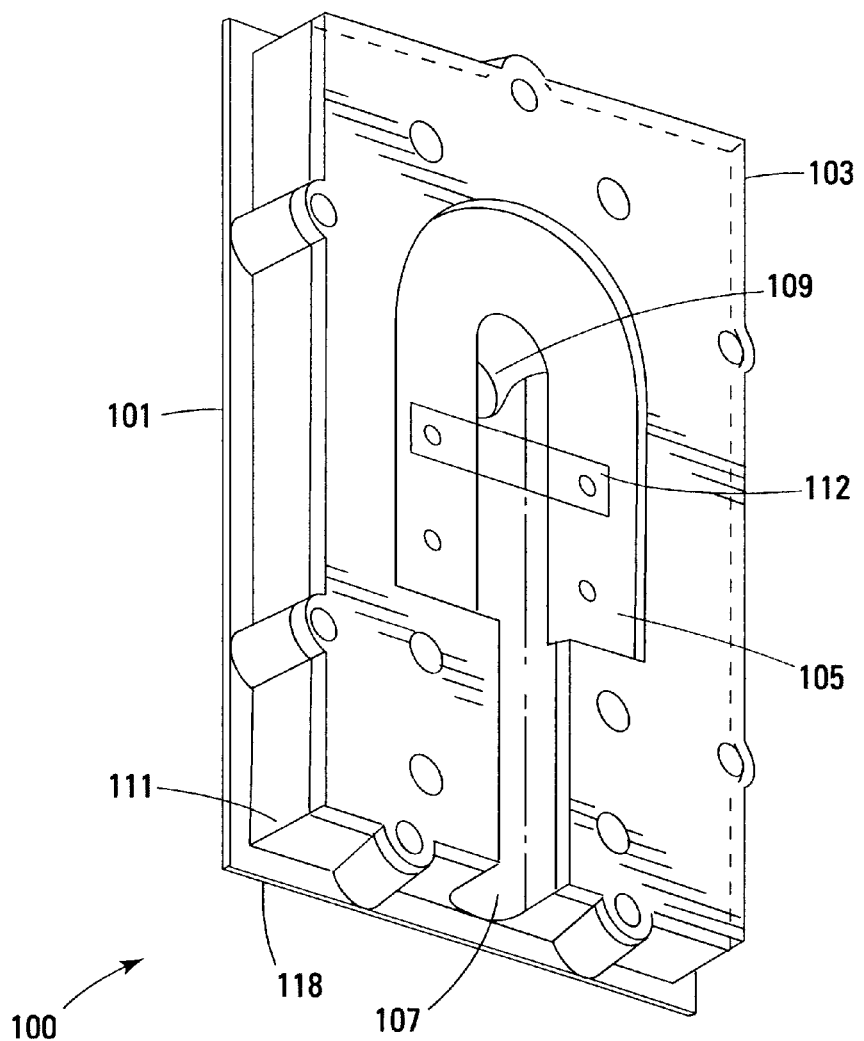
FIG. 1 is an illustration of one embodiment of a cable assembly according to the teachings of this invention.
Figure 6:
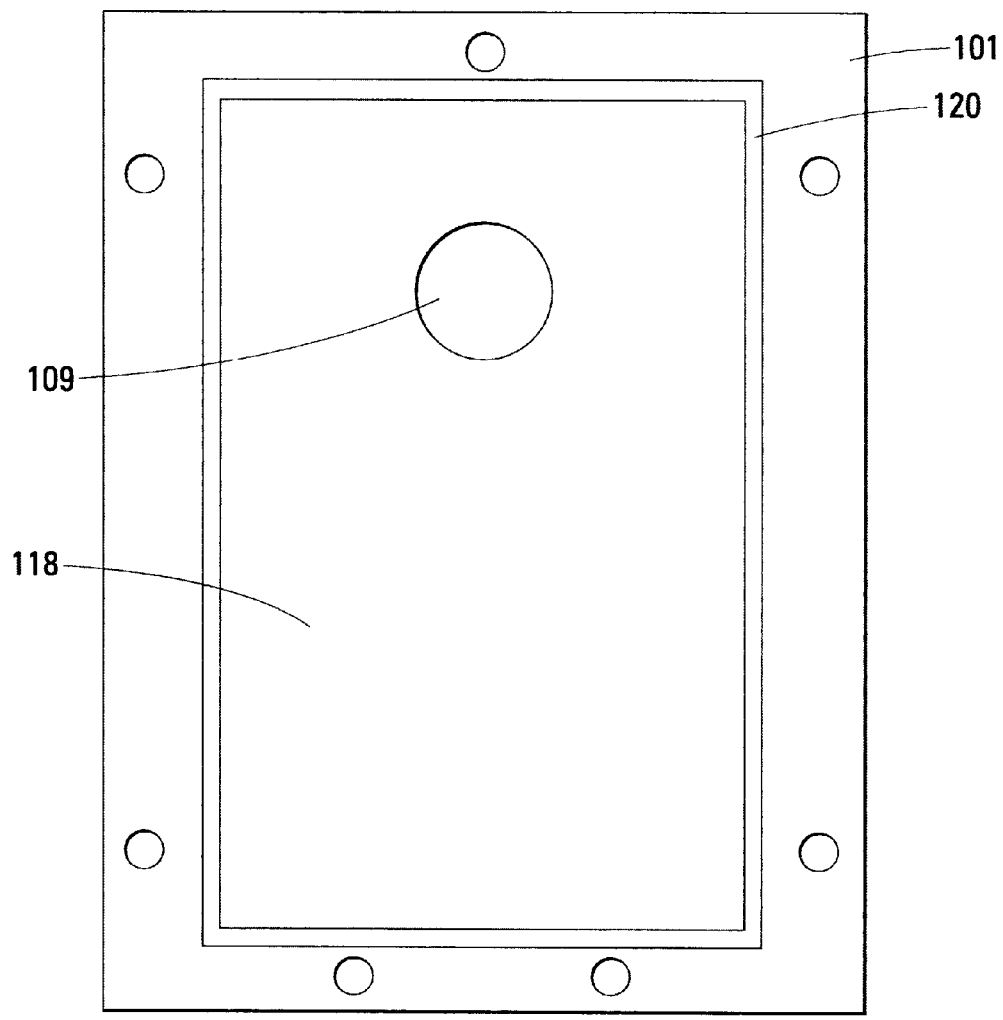
FIG. 6 is a back view of the cable assembly of FIG. 1.

FIG. 1 is an illustration of one embodiment of a cable assembly, shown generally at 100, and constructed according to the teachings of this invention. In one embodiment, cable assembly 100 interfaces with a housing such as a repeater housing and enables one or more cables to interconnect with electronics within the housing. Cable assembly 100 includes an interface plate 101 that has a raised outer surface 111 having an edge 103 around the perimeter of the outer surface 111. Edge 103 creates a cavity or recess capable of receiving a sealant, a gasketing material or the like. Interface plate 101 includes a recess 105 having a channel 107 capable of holding one or more cables. Interface plate 101 includes an opening 109 that allows one or more cables to pass through the interface plate 101. In one embodiment, interface plate 101 is adapted to couple with one or more clamps such as clamp 112 to hold a cable firmly in channel 107. Clamp 112 may comprise a retaining clip, tie or any suitable restraining method. In one embodiment, both the cavity created by edge 103 and recess 105 are adapted to receive a sealant, gasketing material or the like that covers the cable once the cable is placed in the channel 107. The sealant protects the cable from the environment and aids in prohibiting moisture from passing from the outer to an inner surface 118 (shown in FIG. 1 and in FIG. 6, a back view of FIG. 1) of interface plate 101. In one embodiment, the inner surface of interface plate 101 includes a gasket 120. In one embodiment, the gasket 120 is embedded in the inner surface 118 of the interface plate 101, as shown in FIG. 6. In one embodiment, the gasket is of the type employed by the automotive industry for valve cover gaskets. The gasket may be silicone or a suitable equivalent.

In operation a cable is placed in channel 107 of interface plate 101. The cable passes through opening 109 and is secured in channel 107 using one or more clamps such as clamp 112. A sealant is placed in the cavity created 103 and recess 105. Once the sealant has cured the cable is secured in place and sealed from the environment. A complete cable assembly such as cable assembly 100 with a sealant is capable of interfacing with a number of different housings such as telecommunication repeater housings. The complete cable assembly provides protection from environmental elements such as moisture, salt fog, salt water, chemicals, solar loading to include ultraviolet degradation, temperature extremes and the like. In addition the sealant secures the cable in place so as to reduce strain on the cable during and after assembly. In addition, a cable assembly such as 100 including a sealant provides a barrier to air leakage when a housing it is coupled to is pressurized. Since the cable assembly is not integrated with the housing it allows flexibility in locating the housing and then attaching the cable assembly to include horizontal and vertical mounting of the housings. In addition, the cable may be repaired in the field without requiring replacement or removal of the repeater housing. Simply swapping out the cable assembly. A cable assembly such as 100 allows upgrading or changing of cables without replacing the repeater housing. The cable assembly 100 can be mounted so that the cable enters a housing from the top, bottom or either side, based on the application.

Figure 2:
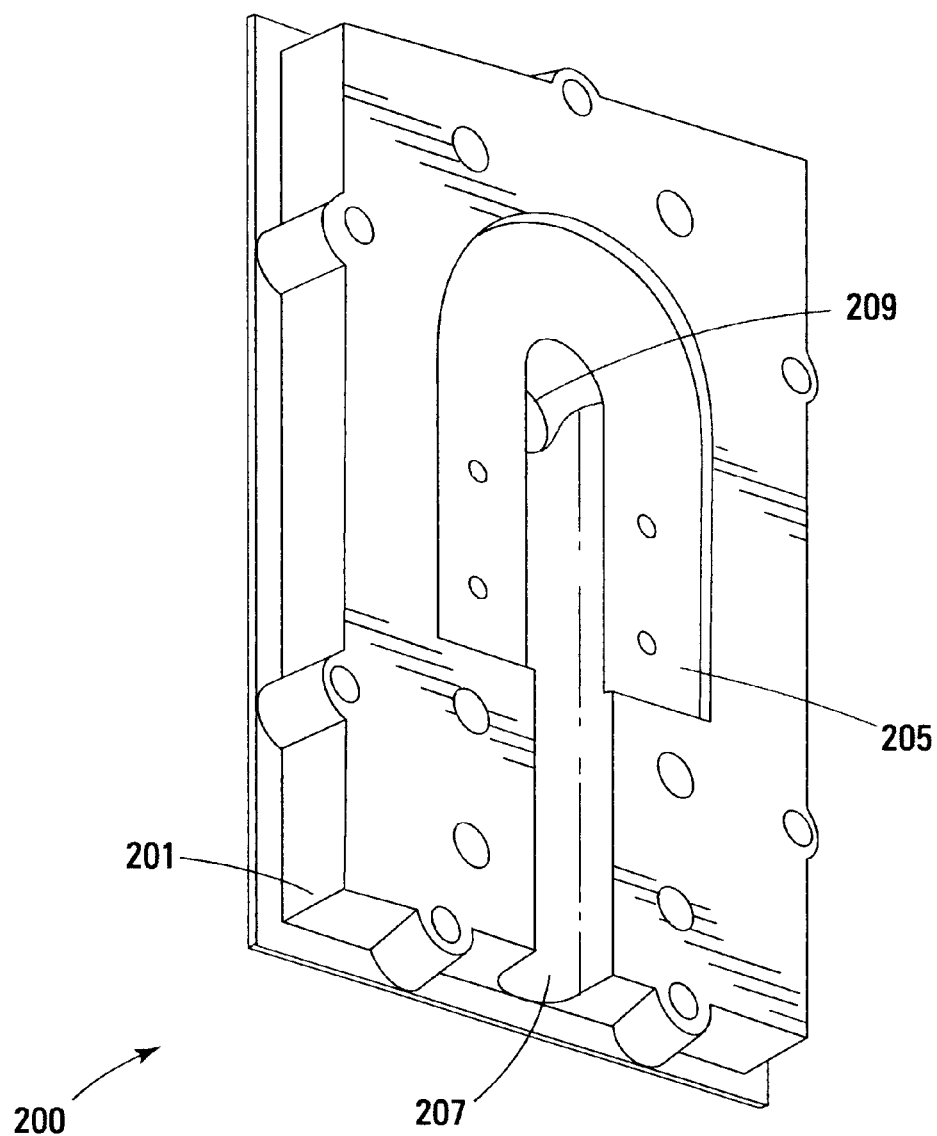
FIG. 2 is an illustration of another embodiment of a cable assembly according to the teachings of this invention.

FIG. 2 is an illustration of another embodiment of a cable assembly, shown generally at 200, and constructed according to the teachings of this invention. Cable assembly 200 includes an interface plate 201. Interface plate 201 includes a recess 205 having a channel 207 that is capable of receiving one or more cables. Interface plate 201 includes an opening 209 that allows one or more cables to pass through interface plate 201. Recess 205 is adapted to receive a sealant that covers the cable once the cable is placed in channel 207. In one embodiment, interface plate 201 is adapted to receive one or more clamps to hold a cable firmly in channel 207.

Figure 3:
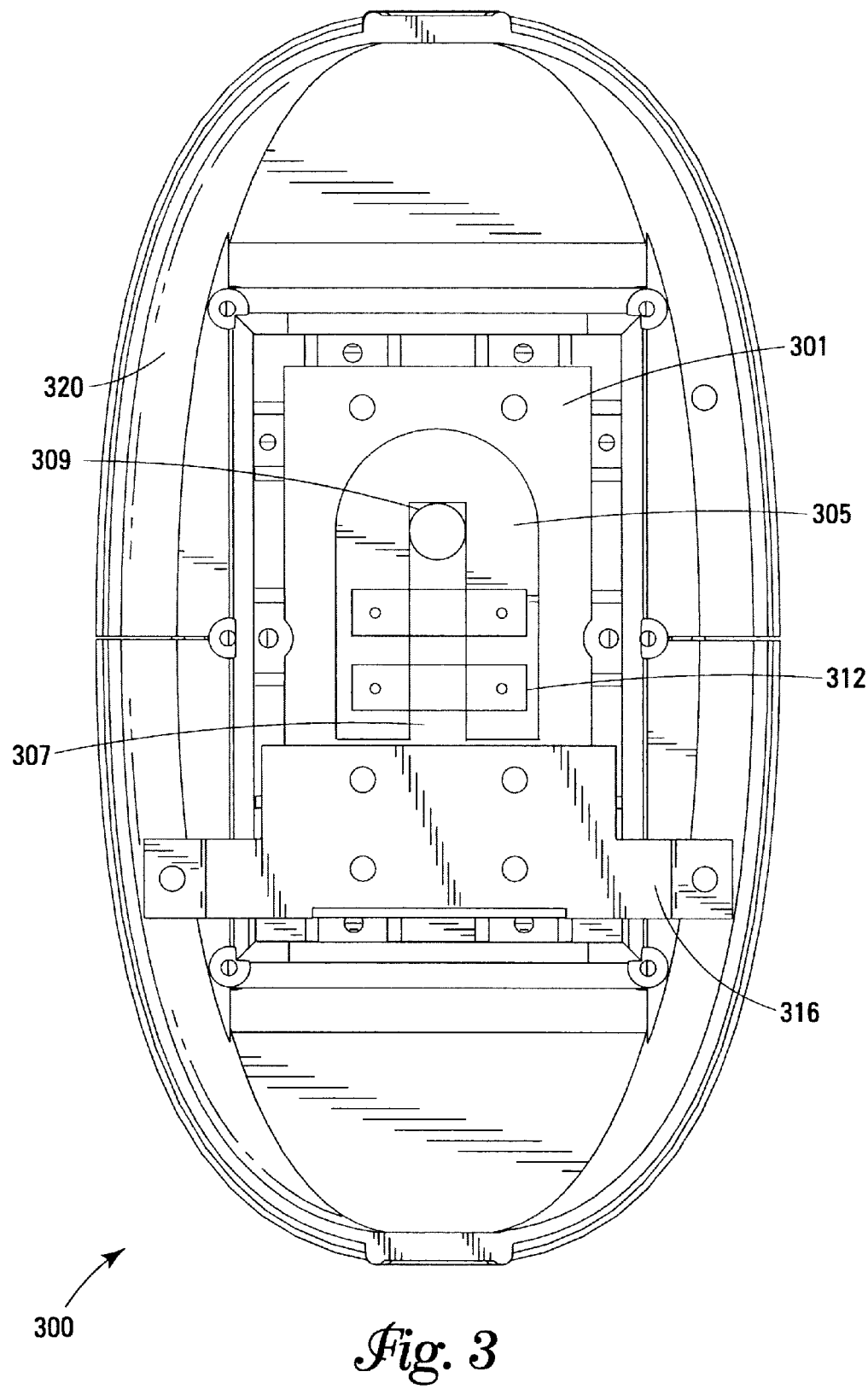
FIG. 3 is an illustration of one embodiment of a repeater housing with a cable head assembly according to the teachings of this invention.

FIG. 3 is an illustration of one embodiment of a repeater housing with a cable head assembly, shown generally at 300, and constructed according to the teachings of this invention. In one embodiment, repeater housing 300 is as described in related case entitled "Mechanical Housing" (U.S. Ser. No. 09/804,129) filed Nov. 6, 2000. In one embodiment, repeater housing 300 includes an interface plate 301 having a recess 305 with a channel 307 for receiving a cable. The interface plate 301 includes an opening 309 at one end of channel 307 that allows one or more cables to pass through interface plate 301. In one embodiment, interface plate 301 includes one or more clamps 312 that hold a cable securely in channel 307. Recess 305 is adapted to receive a sealant that covers and secures the cable once the cable is placed in channel 307. Repeater housing 300 includes an outer shell 320. In one embodiment, shell 320 is adapted to couple to one or more mounting brackets such as bracket 316. Bracket 316 is used to mount repeater housing 300 to a support structure such as a wall, a post, a housing, a pole or the like.

Figure 4:
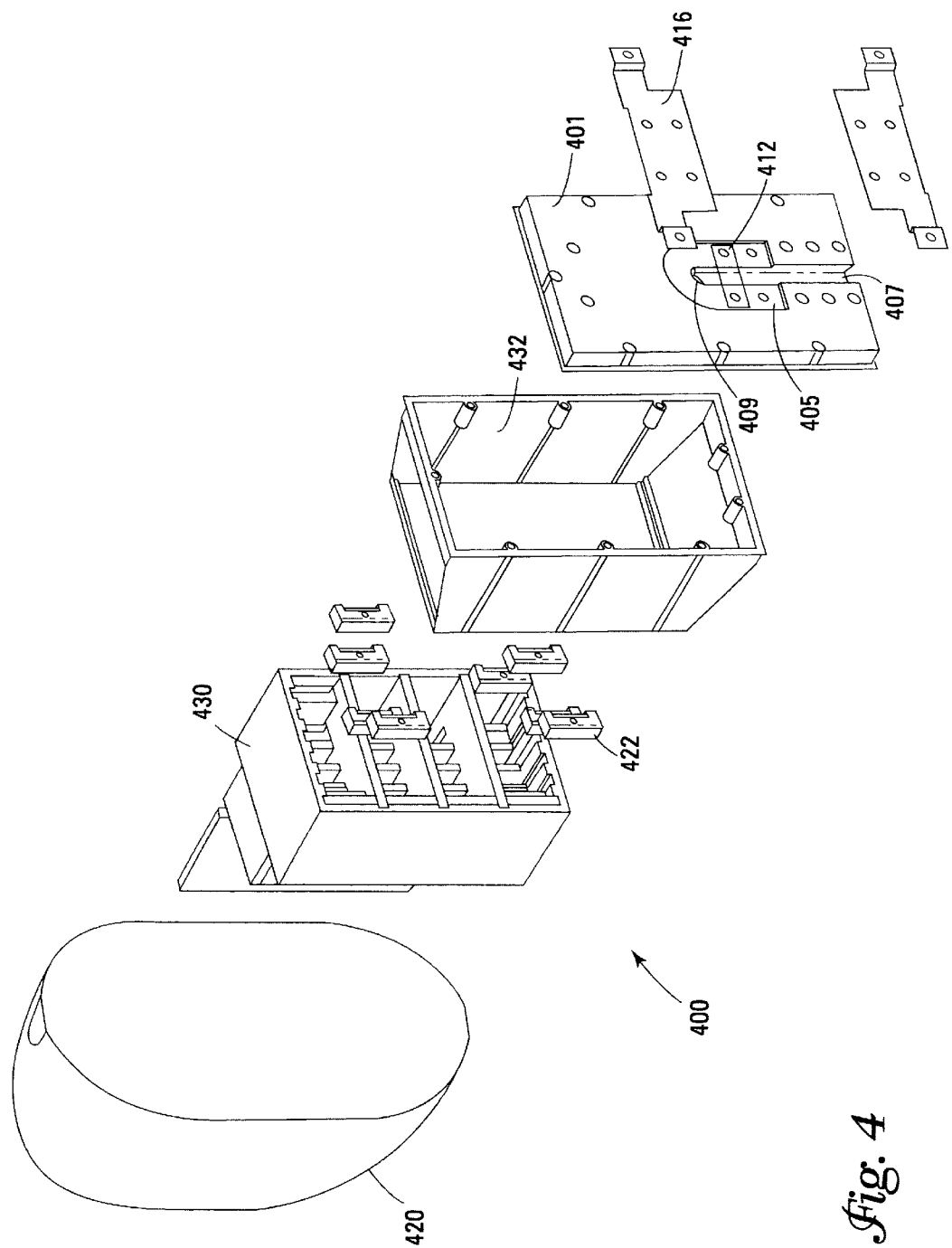
FIG. 4 is an illustration of another embodiment of a repeater housing with a cable head assembly according to the teachings of this invention.

FIG. 4 is an illustration of another embodiment of a repeater housing with a cable head assembly, shown generally at 400, and constructed according to the teachings of this invention. Repeater housing 400 includes an interface plate 401 having a recess 405 with a channel 407 for receiving one or more cables. The interface plate 401 includes an opening 409 at one end of channel 407 that allows the one or more cables to pass through interface plate 401. Interface plate 401 includes one or more clamps 412 that hold the cable(s) securely in channel 407. Recess 405 is adapted to receive a sealant that covers and secures the cable(s) once the cable(s) is/are placed in channel 407. Repeater housing 400 includes an outer shell 420. In one embodiment, shell 420 is adapted to couple to one or more mounting brackets such as mounting bracket 416. Mounting bracket 416 is used to mount repeater housing 400 to a support structure such as a wall, a post, a housing, a pole or the like. Interface plate 401 interfaces with a frame 432 that holds a card cage 430. In one embodiment, interface plate 401 includes a gasket on the face that is in contact with frame 432. In one embodiment, interface plate 401 includes an embedded gasket in the face that is in contact with frame 432. The gasket or embedded gasket aids in protecting the contents of the repeater housing from the environment as well as to aid in maintaining pressure within repeater housing 400. Card cage 430 houses a plurality of repeaters 422 that connect to wires within the cable passed through interface plate 401. In one embodiment, the card cage 430 is thermally coupled to the outer housing 420 to aid in dispersing heat such as described in related application, entitled "Mechanical Housing" (U.S. serial No. 09/804,129) filed Nov. 6, 2000. Once the components of repeater housing 400 are assembled interface plate 401 with the sealant aids in prohibiting moisture from passing into the repeater housing 400.

In one embodiment, interface plate 401 aids in sealing the assembly and prohibiting air leakage when the housing 400 is pressurized.

Figure 5:
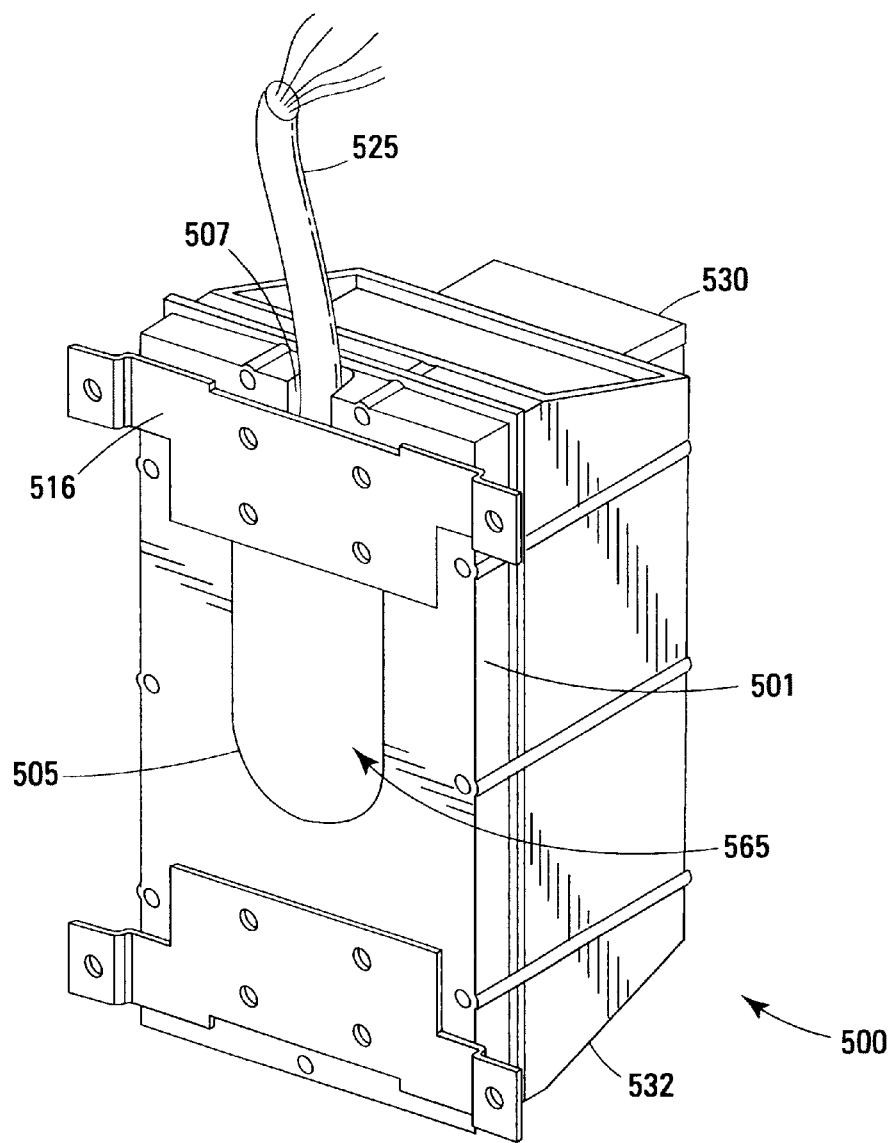
FIG. 5 is an illustration of one embodiment of a cable assembly according to the teachings of this invention.

FIG. 5 is an illustration of one embodiment of a cable assembly, shown generally at 500, and constructed according to the teachings of this invention. Cable assembly 500 includes an interface plate 501 having a recess 505 that is filled with a sealant 565. In one embodiment, cable assembly 500 includes a cable 525 that has been secured in channel 507 with sealant 565. In one embodiment, sealant 565 is an epoxy, a resin, a composite, a polymer or the like. In one embodiment, sealant 565 is an elastomer. The sealant 565 is capable of providing the cable 525 and a housing that the cable assembly 500 couples to protection from environmental elements such as salt, moisture, heat, cold and the like. Interface plate 501 is coupled to frame 532 that holds a card cage 530 such as card cage 430 as described with respect to FIG. 4.

In operation cable 525 is placed in channel 507 and passed through an opening (not visible) in interface plate 501 in order to connect to electronics within card cage 530. In one embodiment, the cable 525 is secured in place in channel 507 using one or more clamps, retaining clips, ties or the like. Sealant 565 is placed within recess 505 so as to cover cable 525 and seal cable 525 securely in place and to protect the cable from the elements.

A cable assembly such as cable assembly 100 or 200 described with respect to FIGS. 1 and 2 respectively can be modified to interface with any number of housings. For example the cable assembly may be adapted to interface with the current 819 telecommunication repeater housings, current canister style repeater housings and the like. The cable assembly modularizes the repeater housings by making it possible to interchange one cable assembly with a number of different types of housings as well as modifying the cable assembly to fit with a number of different types of housings. The size and shape of the interface plate can be modified to adapt to a variety of sized and shaped repeater housings. The type of sealant used to protect the components of a housing may also be changed based on the application. For example, applications may require the cable assembly to be exposed to hot and cold temperature extremes, moisture, salt fog, salt water, chemicals, solar loading to include ultraviolet degradation and the like.

CONCLUSION

In one embodiment, a cable assembly has been described. The cable assembly includes an interface plate having a raised outer surface and an inner surface. The inner surface is adapted to engage with a housing. The interface plate includes a recess having a channel that is adapted to receive a cable and an opening through the interface plate at one end of the channel to allow the cable to pass through the interface plate. The recess is adapted to receive a sealant that covers the cable once the cable is placed in the channel.

In another embodiment, a repeater housing has been described. The repeater housing includes an outer shell, a card cage adapted to thermally couple to the outer shell and an interface plate adapted to couple with the card cage. The interface plate having a raised outer surface and an inner surface. The interface plate includes a recess having a channel that is adapted to receive a cable and an opening through the interface plate at one end of the channel to allow the cable to pass through the interface plate. The recess is adapted to receive a sealant that covers the cable once the cable is placed in the channel.

Although specific embodiments have been illustrated and described herein, it will be appreciated by those of ordinary skill in the art that any arrangement, which is calculated to achieve the same purpose, may be substituted for the specific embodiments shown. For example, the housing and cable assembly described in the detailed description are telecommunication repeater housings and assemblies but the cable assembly described may be used for any number of applications requiring interface with a cable. This application is intended to cover any adaptations or variations of the present invention. Therefore, it is intended that this invention be limited only by the claims and the equivalents thereof.

What is claimed is:

1. A cable assembly comprising:
   an interface plate having a raised outer surface and an inner surface;
   an edge around a perimeter of the outer surface creating a cavity in the interface plate;
   a recess located within the cavity;
   a channel disposed within the cavity and extending into the recess so that an end of the channel is located within the recess, the channel adapted to receive a cable; and
   an opening located at the end of the channel passing between the channel and the inner surface;
   wherein the cavity is adapted to receive a sealant that covers the cable once the cable is placed in the channel.

2. The cable assembly of claim 1, further comprising a bracket disposed within the cavity.

3. The cable assembly of claim 1, further comprising a clamp disposed within the cavity and spanning the channel to secure the cable within the channel.

4. The cable assembly of claim 1, wherein the inner surface of the interface plate includes an embedded gasket.

5. The cable assembly of claim 1, wherein the sealant is an epoxy.

6. A repeater housing comprising:
   a shell;
   a frame disposed within the shell;
   a card cage disposed within the frame;
   a cable assembly attached to the frame, the cable assembly comprising:
     an interface plate having a raised outer surface and an inner surface;
     an edge around a perimeter of the outer surface creating a cavity in the interface plate;
     a recess located within the cavity;
     a channel disposed within the cavity and extending into the recess so that an end of the channel is located within the recess, the channel adapted to receive a cable; and
     an opening located at the end of the recess passing between the channel and the inner surface;
   wherein the cavity is adapted to receive a sealant that covers the cable once the cable is placed in the channel.

7. The repeater housing of claim 6, further comprising a bracket disposed within the cavity of the interface plate.

8. The repeater housing of claim 6, further comprising a clamp disposed within the recess and spanning the channel to secure the cable within the channel.

9. The repeater housing of claim 6, wherein the interface plate aids in at least one of protecting contents of the repeater housing from the environment and maintaining pressure within repeater housing.

10. The cable assembly of claim 6, wherein the sealant is an epoxy.

11. A method of manufacturing a cable assembly, the method comprising:
    forming a cavity within a plate;
    forming a recess within the cavity;
    forming an opening in the recess that passes through the plate between the recess and an inner surface of the plate;
    forming a channel within the cavity that extends into the recess and terminates at the opening;
    laying a cable within the channel;
    directing the cable through the opening; and
    filling the cavity with a sealant so that the sealant covers the cable and closes the opening.

12. The method of claim 11, further comprising disposing a bracket within the cavity.

13. The method of claim 11, further comprising disposing a clamp within the recess so that the cavity spans the channel to secure the cable within the channel.

14. A method for manufacturing a repeater housing, the method comprising:
    forming a shell;
    forming a frame;
    disposing the frame within the housing;
    forming a card cage;
    disposing the card cage within the frame;
    forming a cavity within a plate;

forming a recess within the cavity;

forming an opening in the recess that passes through the plate between the recess and an inner surface of the plate;

forming a channel within the cavity that extends into the recess and terminates at the opening;

laying a cable within the channel;

directing the cable through the opening;

filling the cavity with a sealant so that the sealant covers the cable and closes the opening; and attaching the plate to the frame.

15. The method of claim 14, further comprising disposing a bracket within the cavity.

16. The method of claim 14, further comprising disposing a clamp within the recess so that the cavity spans the channel to secure the cable within the channel.

17. The method of claim 14, wherein attaching the plate to the frame aids in at least one of protecting contents of the repeater housing from the environment and maintaining pressure within repeater housing.

* * * * *